No. 635,540. Patented Oct. 24, 1899.
L. F. GRAMMES.
BOX NAILING MACHINE.
(Application filed Feb. 1, 1899.)
(No Model.) 8 Sheets—Sheet 2.

Fig. 2.

Witnesses:
L. C. Hills
Alfred T. Gage

Inventor:
Lewis F. Grammes
By E. B. Stoetling
Atty.

THE NORRIS PETERS CO., PHOTO-LITHO., WASHINGTON, D. C.

No. 635,540. Patented Oct. 24, 1899.
L. F. GRAMMES.
BOX NAILING MACHINE.
(Application filed Feb. 1, 1899.)
(No Model.) 8 Sheets—Sheet 4.

Witnesses
Inventor:
Lewis F. Grammes,
By E. B. Stockling
Atty

No. 635,540. Patented Oct. 24, 1899.
L. F. GRAMMES.
BOX NAILING MACHINE.
(Application filed Feb. 1, 1899.)
(No Model.) 8 Sheets—Sheet 5.

Witnesses:
L. C. Hills
Alfred T. Gage

Inventor.
Lewis F. Grammes,
By E. B. Stocking
Atty.

No. 635,540. Patented Oct. 24, 1899.
L. F. GRAMMES.
BOX NAILING MACHINE.
(Application filed Feb. 1, 1899.)
(No Model.) 8 Sheets—Sheet 6.

Witnesses:
L. C. Hills.
Alfred T. Gage.

Inventor:
Lewis F. Grammes
By E. B. Stocking
Atty.

No. 635,540. Patented Oct. 24, 1899.
L. F. GRAMMES.
BOX NAILING MACHINE.
(Application filed Feb. 1, 1899.)

(No Model.) 8 Sheets—Sheet 7.

Witnesses:
Inventor: Lewis F. Grammes,

No. 635,540. Patented Oct. 24, 1899.
L. F. GRAMMES.
BOX NAILING MACHINE.
(Application filed Feb. 1, 1899.)
(No Model.) 8 Sheets—Sheet 8.

Witnesses:
L. C. Hills
Alfred T. Gage

Inventor:
Lewis F. Grammes,
By E. B. Stocking
Atty.

UNITED STATES PATENT OFFICE.

LEWIS F. GRAMMES, OF ALLENTOWN, PENNSYLVANIA, ASSIGNOR TO HIMSELF, HARRY A. GRAMMES, CHARLES W. GRAMMES, AND J. FRANK GRAMMES, OF SAME PLACE.

BOX-NAILING MACHINE.

SPECIFICATION forming part of Letters Patent No. 635,540, dated October 24, 1899.

Application filed February 1, 1899. Serial No. 704,108. (No model.)

*To all whom it may concern:*

Be it known that I, LEWIS F. GRAMMES, a citizen of the United States, residing at Allentown, in the county of Lehigh, State of Pennsylvania, have invented certain new and useful Improvements in Box-Nailing Machines, of which the following is a specification, reference being had therein to the accompanying drawings.

This invention has relation to nailing-machines as a class, and comprises certain improvements upon that kind of nailing-machines disclosed in United States Patent No. 249,245, granted November 8, 1881, to G. L. Knauss and myself as joint patentees.

Among the objects of the invention are to provide a machine which can be operated by foot or power and can be readily changed from one to the other; to provide means for a fine adjustment of the work-table of the machine, and this by simple and readily-accessible devices; to provide not only for the convenient adjustment of the positions of a nail-chuck, but also for the ready removal of such chuck from the machine, whereby the number of chucks in use and the positions to which they shall present nails to the work to be driven is under an absolute and convenient control of the operator; to provide a movable feed-box rake of peculiar form and adapted to throw off the surplus nails which do not enter the slots in the feed-box and prevent the nails from clogging; to provide a picker or nail cut-off which shall be positive in its action in presenting but one nail at a time to the feed-tubes; to provide a safety picker-bar-operating cam, whereby if a defective nail is caught in the picker no injury occurs to the machine, but, on the contrary, at the next stroke said imperfect nail is freely delivered from the picker; to provide means whereby the drivers are loosely connected with the driver-bar of the machine, so that in operation they will automatically assume a true vertical position with relation to the chucks, and thereby prevent undue wear of the latter or of themselves and to distribute the necessary wear evenly upon all parts coming in contact with each other, and to provide a safety nail-chuck which shall be capable of being opened to free and deliver from the chuck any surplus or imperfect nails which may accidentally or otherwise be collected therein.

The invention has further objects and purposes, which will appear in the following description and the novel features of which will be particularly pointed out in the appended claims.

Referring to the drawings.

Like letters of reference indicate like parts throughout all the figures of the drawings.

The letter A represents the base of a machine, upon which are mounted the sides of the framework B, upon which is movably mounted the table C of the machine. Upon the side frames B there are secured side frames D, in which the reciprocating parts carrying the chuck-bar E and the hammer or driver bar F are mounted. Upon the frames D a supporting-frame G is provided for the inclined feed-table or nail-track plates H. Pivotally supported from the upper portion of the frame G is the feed-box I. The base A is adapted to receive and support the driving mechanism, which may be used for actuating the parts. For instance, in Figs. 1 and 17 I have illustrated the machine provided with a treadle A', having a foot-piece $A^2$, removably secured by a set-bolt $a$ at the front of the machine. The rear of this treadle is provided with forked arms $A^3$ and $A^4$, the latter being provided with suitable counterbalancing-weights $A^5$ and the former connected by means of a pitman $A^6$ with a bell-crank lever $A^7$ and connecting-rod $A^8$, pivotally connected to the end of the feed-box I. The connecting-rod $A^9$ also extends from the forward part of this treadle A' to impart motion to the mechanism for reciprocating the nail-chucks and driver-bar. It will be seen that a depression of the foot-piece $A^2$ will draw downward the chuck and driver bars, for a purpose to be hereinafter described, and also depress the feed-box.

Figure 1:
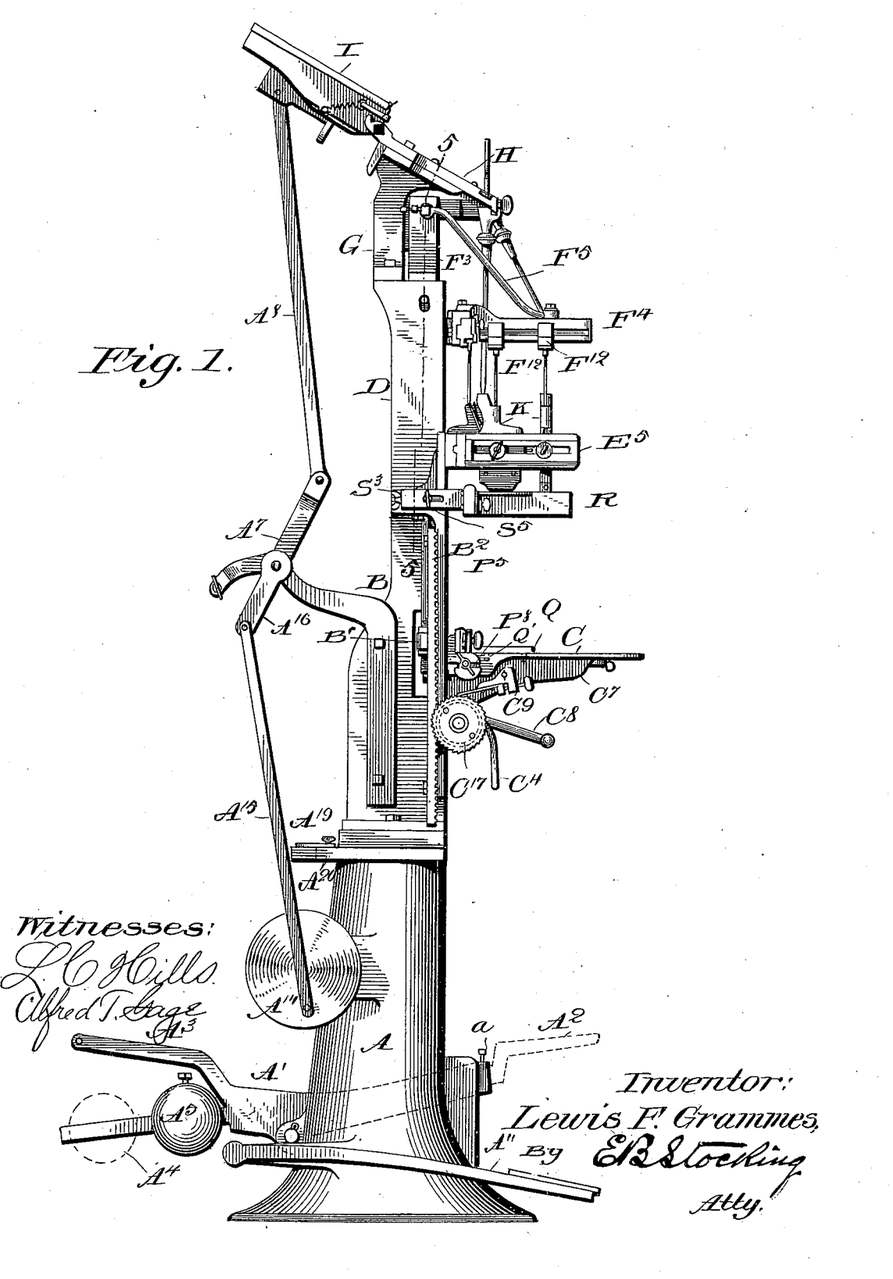
Figure 1 is a left side elevation.
Figure 17:
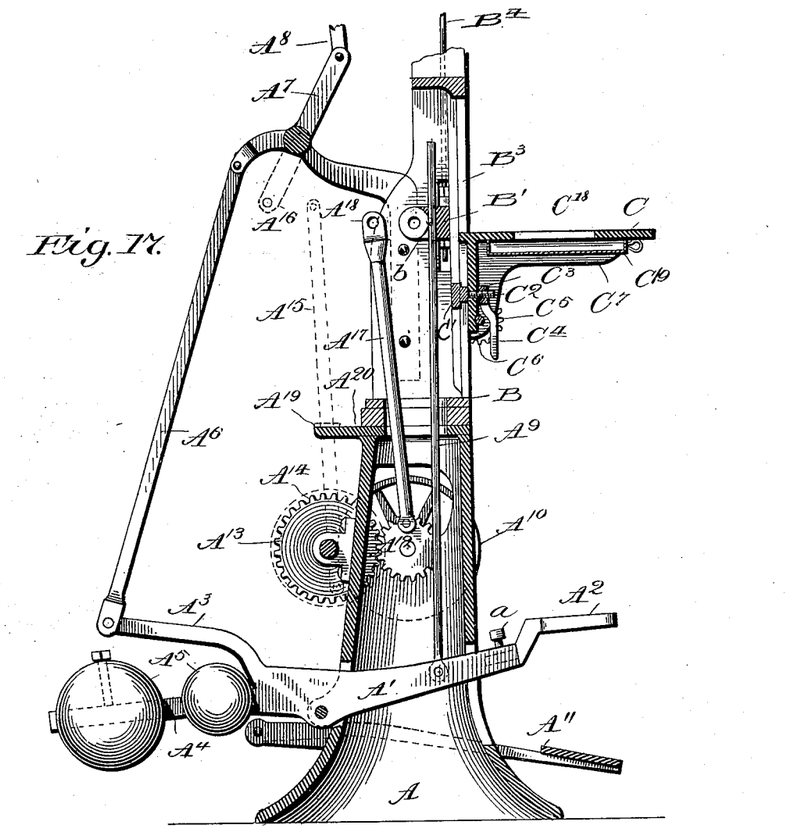
Fig. 17 is a central vertical section of the lower portion of the machine, illustrating the devices employed for driving the machine either by foot or by other motive power.

When it is desired to drive the machine by power, the same may be applied to a suitable driving-pulley $A^{10}$, which may be thrown in or out of operative connection with the power by means of a treadle $A^{11}$, suitably connected thereto. Upon the shaft of the driving-wheel $A^{10}$ a pinion $A^{12}$ is secured, which in turn meshes with a pinion $A^{13}$, journaled upon the exterior of the base A, the said journal being provided with a disk $A^{14}$, upon which is eccentrically mounted a connecting-pitman $A^{15}$, adapted to be secured to an auxiliary arm $A^{16}$, depending from the crank-lever $A^7$, as shown in Fig. 1 and in dotted lines in Fig. 17. For the purpose of reciprocating the cross-head B' a pitman $A^{17}$ is eccentrically connected to the gear $A^{12}$ and removably connected to said cross-bar, as at $A^{18}$. When the bar $A^{15}$ is disconnected from the arm $A^{16}$ and the machine used with the foot-treadle, this bar may be held against movement by means of a latch $A^{19}$, pivoted upon a flange $A^{20}$ at the upper portion of the base and adapted to be swung into contact with said bar, and the pitman $A^{17}$ is likewise disconnected and the power mechanism remains at rest. It is obvious that by connecting the parts, as shown in Fig. 1, the power mechanism may be used, and by disconnecting the same and connecting the treadle mechanism, as shown in Fig. 17, this mechanism may be used, although no objection has been found to leaving the treadle mechanism in operative connection with the power mechanism as applied, especially when the foot-piece $A^2$ is removed, so as not to be in the way of the operator.

Figures 22, 23:
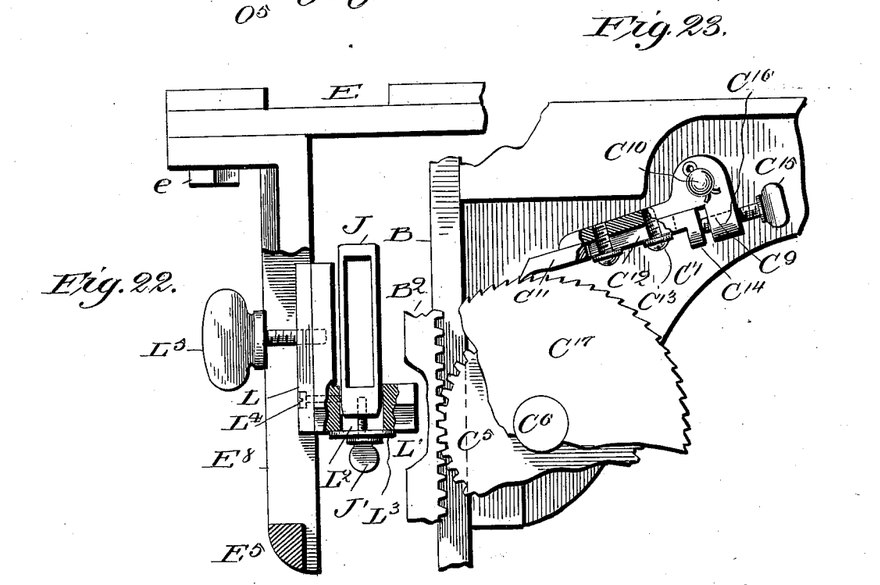
Fig. 22 is a plan, with parts in section, of an end bracket for supporting nail-chucks for nailing at the ends of the boxes.
Fig. 23 is a detail, on an enlarged scale, of the means employed for obtaining fine adjustment of the feed-table of the machine.

The frame B is provided at each side with a rack-bar $B^2$, rigidly secured thereto. At the front of the side frames B the table C is slidingly mounted by means of a cross-bar C', which engages flanges $B^3$, and is provided with a threaded bolt $C^2$, upon which a clamping-nut $C^3$ is placed, so as to be rotatable, by means of a wrench-handle $C^4$, for the purpose of securely clamping the table when the same has been properly adjusted. For the purpose of securing this adjustment pinions $C^5$ are secured to the opposite ends of a shaft $C^6$, mounted in the side walls $C^7$ of the table C. This shaft has upon its end a suitable operating-handle $C^8$, by which the main adjustment of the table is effected. It has been found necessary, however, in this class of machines to provide a very small and delicate adjustment of the table when operating upon thin boards, so as to accurately adjust the depth to which the nail will be driven, and this is effected by means of a feed-pawl $C^9$, (see Fig. 23,) pivoted at $C^{10}$ upon one of the side walls $C^7$ and provided with an adjustable tooth $C^{11}$, having a slot $C^{12}$, through which pass retaining-screws $C^{13}$, provided with suitable washers and carried by the body of the pawl $C^9$. The tooth $C^{11}$ is provided with a lateral extension or bearing $C^{14}$, against which a thumb-nut $C^{15}$ operates, said nut being threaded through the block $C^{16}$, carried by the pawl $C^9$. This pawl coöperates with a ratchet-wheel $C^{17}$, carried upon the shaft $C^6$, to which the pinions $C^5$ are also secured, whereby the adjustment of the thumb-screw $C^{15}$ operates the tooth $C^{11}$ to rotate the ratchet $C^{17}$ and the pinions, so as to effect a more accurate adjustment of the table, which may be locked in its adjusted position by means of the nut $C^3$. The withdrawal or reverse motion of the thumb-screw $C^{15}$ permits the table to be lowered by gravity to the extent that the tooth $C^{11}$ is allowed to recede. When it is desired to lower the table for a material distance, by using crank $C^8$ the entire pawl $C^9$ is swung upon its pivot $C^{10}$ out of engagement with the ratchet-wheel and when again engaged therewith permits the upward movement of the table and also maintains the same at its adjusted position.

Figure 4:
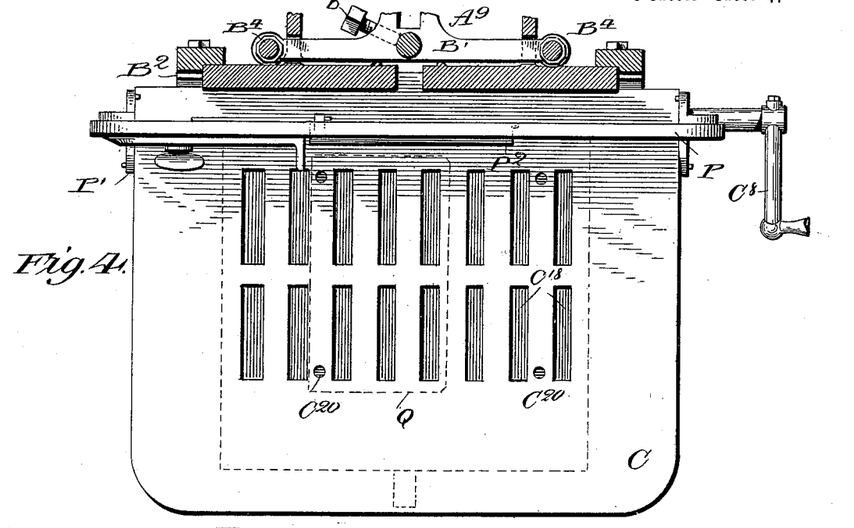
Fig. 4 is a plan of the table which engages with the adjacent framework shown in horizontal section on the line 4 4 of Fig. 3.

The table, Fig. 4, is provided with a series of apertures $C^{18}$, which permit any loose nails falling upon the same to pass into a suitable receiving-tray $C^{19}$, which is removably mounted beneath the table, whereby all loose nails may be caught and retained to be again used in the machine, if desired. This table is also provided with sockets $C^{20}$, adapted to receive a bed-plate, for a purpose to be hereinafter described.

Figure 2:
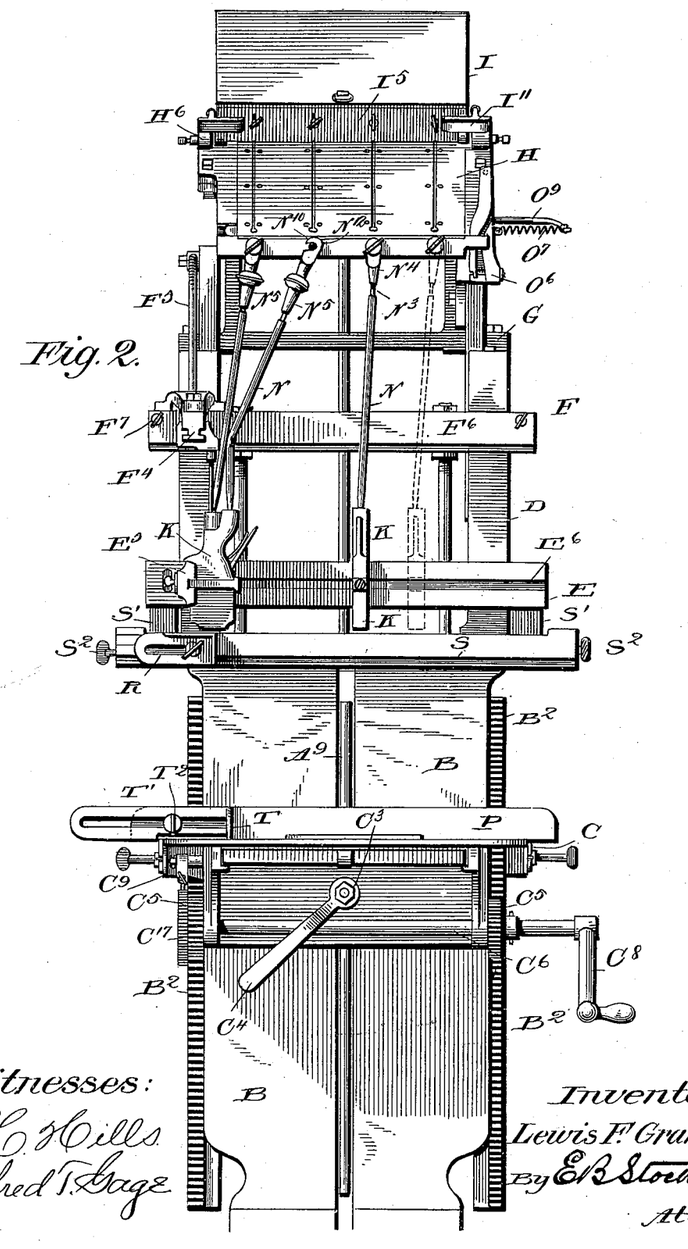
Fig. 2 is a front view of the upper part of the machine.
Figure 3:
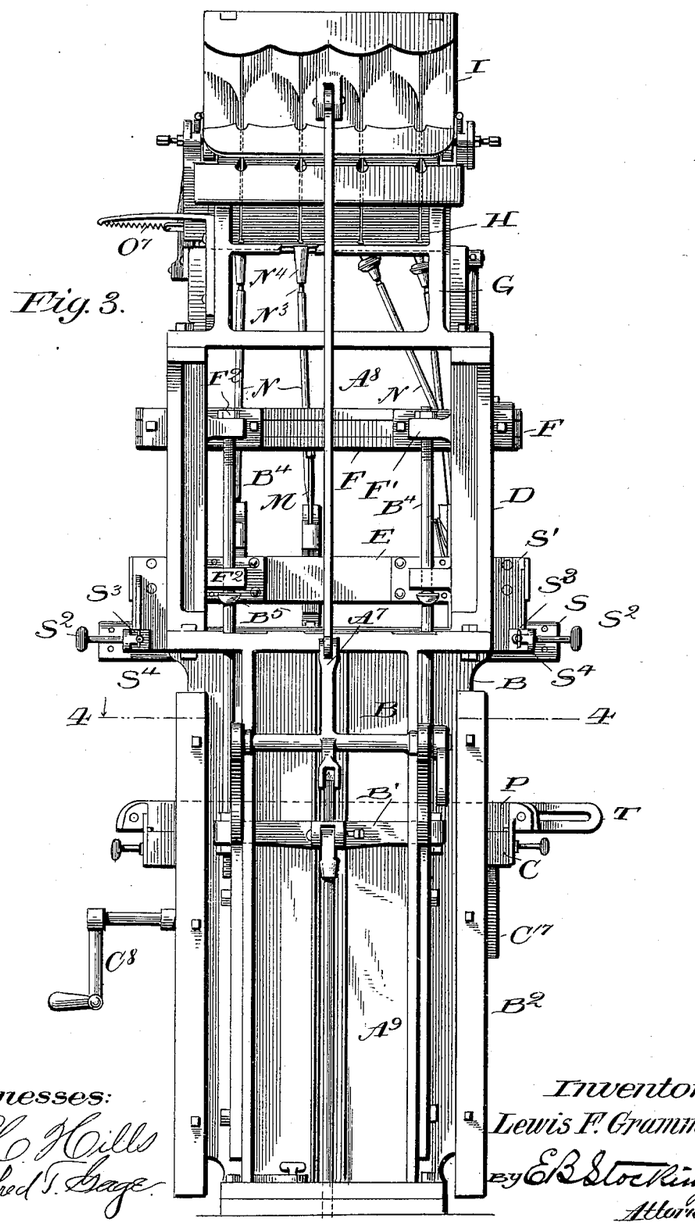
Fig. 3 is a rear view of the upper part of the machine.

The cross-head B' is removably secured to the pitman A⁹ by means of the set-screw b, and from opposite ends of this bar extend vertical rods B⁴, connected at their upper ends with lugs F', extending from the rear of the hammer or driver bar F. This connection is effected by means of nuts F², threaded upon opposite sides of the lug F', whereby the attachment of the lug upon the rods may be adjusted to secure the desired range of movement. The hammer-bar F is provided with a vertical extension F³, Figs. 1 and 2, which is connected with an angle-arm F⁴ of the hammer-bar by means of a brace-rod F⁵, which receives the strain upon said angle-arm during the nailing operation.

At the front of the machine and beneath the hammer-bar F the chuck-bar E is located, which is provided with a vertical portion E' and unthreaded apertured lugs E², through which the rods B⁴ pass. This chuck-bar is normally moved downward by gravity and is elevated by means of collars B⁵ upon the rods B⁴, which in their upward movement engage the projections E², lifting the chuck-bar and with it the hammer-bar F. The vertical extension E' of the chuck-bar E is provided with a pin or projection E³. This projection extends through an aperture E⁴ in the frame D, and thus limits the upward movement of the chucks and their bar and the downward movement thereof. The result of this construction is that as the connecting-rods B⁴ descend both the chuck and hammer bars travel downward, the former stopping when limited by the projection E³ and the latter continuing downward for the proper distance to drive the nail.

Figures 13, 14, 15:
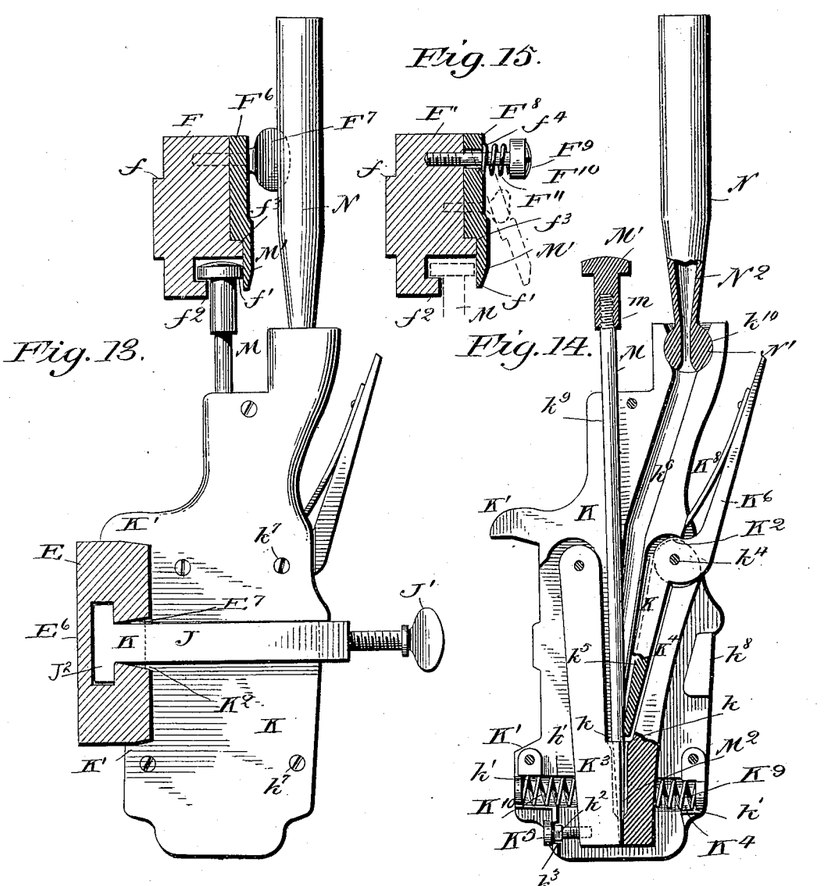
Fig. 13 is a side elevation of one of the nail-chucks and adjacent parts with the chuck-bar and hammer-bar in cross-section.
Fig. 14 is an interior view of the nail-chuck.
Fig. 15 is a modification of the means for retaining the drivers in connection with the hammer-bar.

The chuck-bar E is provided with an angle-arm E⁵, (see Figs. 1 and 2,) adapted to carry the chucks to operate upon the end of the box or upon a surface at an angle to the main chuck-bar. The chuck-bar E is provided with a longitudinal undercut slot E⁶, (see Fig. 13,) having an entrance-slot E⁷, tapering inward, so as to permit a limited movement of the chuck bail or clamp J, which supports the chuck K by means of a set-screw J', bearing against the same. The bail or chuck-clamp J is provided with a head J² of substantially T shape, as illustrated in Fig. 13, and the chuck K is provided with supporting-lugs K', adapted to bear upon the top and bottom of the chuck-bar and hold the case in proper relation thereto. A projection K² is also provided and adapted to enter the slot E⁷ and travel therein whenever the chuck is adjusted longitudinally on the bar E. The angle chuck-bar E⁵ is removably secured to the main bar E by means of a suitable screw-bolt e (see Fig. 22) and is longitudinally slotted, as at E⁸, to receive the rib L, extending from a chuck-holder L', adapted to receive and hold the bail J, heretofore described. This bail J is introduced into the slot L² and secured in position by the set-screw J', passing through an interposed washer L³, and may be additionally held by means of a set-screw L⁴, passing through the side wall of the holder, as indicated in dotted lines in Fig. 22. The holder L' is secured in the slot E⁸ of the angle-arm E⁵ by means of a thumb-nut L⁵, passed into a threaded socket in the rib L and body of the holder. By loosening this thumb-nut the holder can be adjusted longitudinally of the angle-bar to lock the chuck adapted to be carried by the bail J at any desired point above the work.

Figure 16:
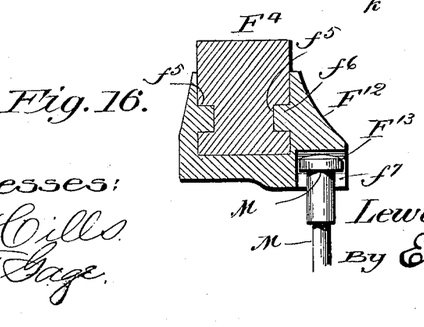
Fig. 16 is a cross-section of a hammer-bar employed in connection with the devices for driving nails in the ends of boxes simultaneously with driving nails in their sides.

The hammer-bar F, Figs. 13 and 15, is provided with an angular portion f at its rear adapted to fit a suitable socket to hold the bar against movement and is provided at its lower portion with a recess f', having a partial bottom wall f², adapted to pass beneath the head M' of a hammer M. This head is retained in the recess f' by means of a removable plate F⁶, through which a retaining thumb-screw F⁷ is passed. This plate is provided with a shoulder adapted to seat upon a shoulder f³, formed upon the hammer-bar, and by removal of the thumb-screws F⁷ the plate can be moved outward, so as to release the head of the hammer M, which normally is loosely seated within the recess f' to thus permit the same to assume the position to which it may be directed in its passage through the chuck K. This is a very desirable feature, as it prevents the driving of the hammer in a line other than vertical, as the chuck directs the hammer in a direct line upon the head of the nail, and the loose mounting of the hammer permits the same to follow this line. As shown in Fig. 13 of the drawings, the head of the hammer is also rounded, so that the impact between the bar F and the head M' will cause the same to partially rotate in the successive nailing operations, and thus equalize the wear upon the several parts of the hammer. The head M' is threaded upon the body M of the hammer, so that the same may be adjusted to vary the distance of its stroke and to take up any lengthwise wear, as illustrated at m in Fig. 14. I have also illustrated in Fig. 15 a modified form of retaining-plate F⁸ for the hammer-bar, in which the plate F⁸ is of the same general configuration as shown in Fig. 13, but is provided with an enlarged aperture f⁴, through which a bolt F⁹ passes, and is surrounded by a spring F¹⁰, bearing upon the front of the retaining-plate F⁸. When it is desired to move the hammer from the recess, the retaining-plate F⁸ may be moved directly away from the hammer-bar F or may turn or swing upon the bolt F⁹ as a pivot, as indicated in dotted lines in Fig. 15. If found desirable in either of these modes of operation, a locking thumb-screw F¹¹ may be passed through the lower portion of the retaining-plate F⁸ and into the body of the hammer-bar. This bolt will firmly secure the plate in position and, if desired, may be removed to permit the ready removal of the hammers. The head M' of the hammer may be flattened upon its upper surface, as indicated in dotted lines in Fig. 15, and thus contact secured between the hammer-bar and the entire upper face of the hammer. The angle end arm $F^4$, Fig. 16, of the hammer-bar F is provided with suitable grooves $f^5$, adapted to receive a hammer-holder $F^{12}$, provided with ribs $f^6$, adapted to enter the grooves $f^5$ and to be adjusted longitudinally of the angle-arm $F^4$. The holder $F^{12}$ is provided with a recessed portion $F^{13}$, adapted to receive the head M' of the hammer M, and is provided with a flange $f^7$, adapted to rest beneath the head M' and withdraw the hammer in the upward movement of the bar. These holders $F^{12}$ are readily adjusted upon the bar $F^4$ whenever the chucks K may be moved upon their supporting-bar.

The nail-chuck K is particularly adapted to prevent clogging and to insure the proper driving of a nail, and for that purpose the lower portion $M^2$ of the hammer is reduced in diameter and passes between opposite jaws $K^3$ and $K^4$, both pivoted at their upper ends and having nail-receiving grooves $k$ extending for a portion of their length. (See Fig. 14.) The jaws are held in contact with each other by means of tension-springs $K^9$ and $K^{10}$. The latter, acting on the jaw $K^3$, must (to insure extreme adjustments by screw $k^2$) be of greater strength, and which springs are located in suitable recesses $k'$ at opposite sides of the jaws, and the jaw $K^3$ is limited in its inward movement by the adjustable set-screw $K^5$, which is provided with a squared shank $k^2$, operating in an angular aperture formed in a cross-wall $k^3$ of the casing. By an adjustment of this screw the movement of the jaw $K^3$ may be properly limited and the chuck thus adjusted to hold the nail at the proper center to be driven by the hammer M. Upon the pivot $k^4$ of the jaw $K^4$ a safety-lever $K^6$ is provided, which carries an auxiliary jaw $K^7$, its inner end lying within a recessed portion of the jaw $K^4$ and provided with a suitable nail-conducting groove $k^5$, which is normally in alinement with the nail-groove of the chuck. The auxiliary jaw $K^7$ is normally held at the inward limit of its movement by means of a spring $K^8$, connected to the lever $K^6$ and bearing against the casing of the chuck, so that when the hammer is in position the jaw $K^7$ is in contact with the same and directs the nails downward into the proper position between the jaws $K^3$ and $K^4$ in the reciprocatory movement of the hammer and chuck bars. This auxiliary jaw prevents any clogging of the main jaw and permits the entrance of only a single nail at one time into the groove $k$, where the same will be engaged by the end $M^2$ of the hammer and close said groove when the hammer is raised. If bent or other nails should by accident or otherwise become caught in the chuck, the same can readily be released by throwing the lever $K^6$ toward the casing of the chuck, and thus opening both the auxiliary jaw $K^7$ and the main jaw $K^4$ to permit the release and discharge of any nails which may be caught in the chuck. This prevents any possible breakage of the parts by clogging, and the loose mounting of the hammers causes the same to be automatically adjusted to any movement of the chuck, and by the adjustment of the hammer-head wear of the parts may be compensated for, while the movement of the hammer prevents any unequal wear upon the parts of the chuck. The chuck-casing may be secured together in any desired manner—for instance, by means of the usual screws $k^7$, connecting the parts of the casing, and the outward movement of the jaw occasioned by the lever $K^6$ is also limited by means of a stop $k^8$, formed upon the casing. It will be observed that the main groove or way $k^6$ is formed partially in each member of the chuck-casing, so that when the same are assembled the groove is complete, and the same also exists in relation to the groove $k^9$, through which the hammer M reciprocates. At the upper end of the groove $k^6$ a suitable socket $k^{10}$ is formed, adapted to receive a ball-head N' at the lower end of the feed-tube N.

The feed-tubes N are provided with apertures $N^2$, through which the nails pass, and have at their upper ends telescoping sections $N^3$, which are adapted to be connected to the hoppers $N^4$, attached beneath the nail-discharge openings of the inclined feed-table H, and may be moved in any desired direction to accommodate themselves to the location of the chucks. The chucks, which are located upon the angle-bar $E^5$, are provided with feeding-tubes having an additional ball-and-socket connection at the upper end of the telescoping tube $N^3$, Fig. 10. The upper ball-and-socket joint is of peculiar construction and consists of a body portion $N^5$, forming one-half or a segment of the socket, the other member or segment thereof $N^6$ being removable therefrom and held in position by means of a circular coiled spring $N^7$ or other suitable device. This socket receives a ball member $N^8$, formed upon the lower portion of the hopper $N^4$, and the socket is provided with a feed-aperture $N^4$, communicating with the aperture $n'$, extending through the telescoping tube $N^3$. It will be obvious that by removing the spring or band $N^7$ from its seat around the equator of the socket the member $M^6$ thereof may be removed and the feed-tube disconnected from the hopper $N^4$. By providing these ball-and-socket joints the chucks are rendered adjustable to any desired position, and the feed of the nails during the same is maintained in a straight line or lines, whereby all the disadvantages incident to curves or obstructions in the feeding of the nails through the tubes are obviated.

The hoppers $N^4$ are provided with tapering receiving-openings $N^9$, adapted to lie beneath the delivery-apertures from the feed-table, and are held in position by means of a hook N¹⁰, formed upon the extension N¹¹, which hook passes over the shank of the thumb-bolt N¹², passed into the front or face of the feed-table. (See Fig. 2.) By slightly loosening this bolt the hopper can be moved laterally thereof and disengaged from the bolt, while it can likewise be very quickly and readily attached by simply engaging the hook N¹⁰ over the bolt and adjusting the same to clamp the parts in position.

Figure 20:
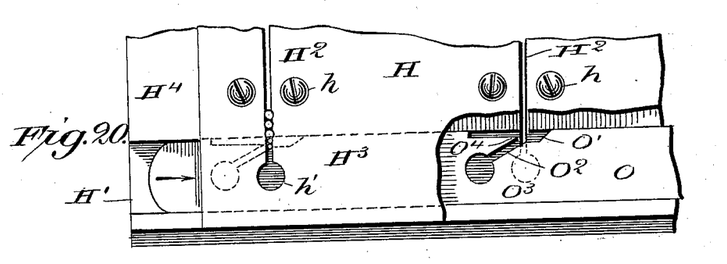
Fig. 20 is a plan of the inclined feed-table and picker-bar.
Figure 21:
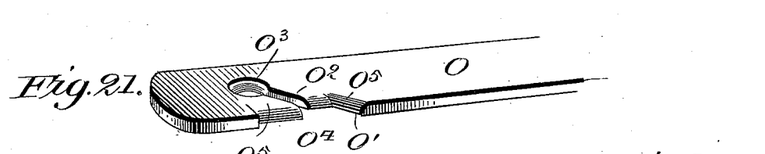
Fig. 21 is a perspective looking at the under side of the picker-bar.

The nails fed to the hoppers N⁴ and through the tubes N to the chucks are received or dropped into said hoppers by means of a picker-bar and cut-off O. (Illustrated in detail in Figs. 20 and 21.) This bar reciprocates in a groove or way H', formed at the lower edge of the inclined feed-table H, said table being provided with any desired number of feeding-slots H² of such diameter as to prevent the nail-head dropping through the same, yet allowing an easy movement by gravity of the body of the nail within the slot or way. These ways may be formed in any desired manner—for instance, by a top plate H³, secured by screws $h$ to a bottom plate or base H⁴—and the lower portion of the ways H² is suitably enlarged, as at $h'$, to allow the head of the nail to pass through. The picker-bar O is provided with a longitudinal recessed portion O', from which a diagonal slot O² extends to an enlarged aperture O³, the latter coming into alinement with the nail-receiving hoppers and discharging a nail, which is picked by the point O⁴ upon the bar. This point passes between the bodies of adjacent nails, separating the same and feeding only a single nail downward toward the aperture $h'$ by the inclined wall of the slot O² until the aperture O³ comes into alinement with the aperture $h'$, when the nail will be released and dropped into the hopper beneath these apertures. It is obvious that when the bar has reached this position all further feed of the nails is cut off, so that it is impossible for more than one nail to be fed at a time, and all choking of the apparatus thereby obviated. The recessed portion O' on the bar permits the reciprocation of the same without affecting the position of the nail, which is not acted upon by the inclined wall of the slot O², whereby said nail is in position to be picked off in the further movement of the bar. It will be further observed by Fig. 21, which shows a perspective of the bottom of the picker-bar, that the under surfaces of the recess and point O⁴ are beveled, as indicated at O⁵. This is for the purpose of permitting the body of the nail to freely swing into a vertical line when it is supported from its head as a pivot. When a series of nails are extending in the feedways H², it frequently happens that the bodies of the same are not in a vertical plane, and if the walls of the bar coming upon the nail were straight no opportunity would be given the nail to swing into a vertical plane, so as to lie directly over the center of the funnel or feed-tube. The beveling of the walls, as shown in Fig. 21, permits this action of the nail and drops the nail with its body in a vertical plane. This beveling of the picker-bar permits the use of metal of suitable thickness to prevent bending, which would occur with the use of thin material, owing to pressure and tension when the bar is provided with a guideway extending from the beveled portion to the discharge-recess.

Figure 8:
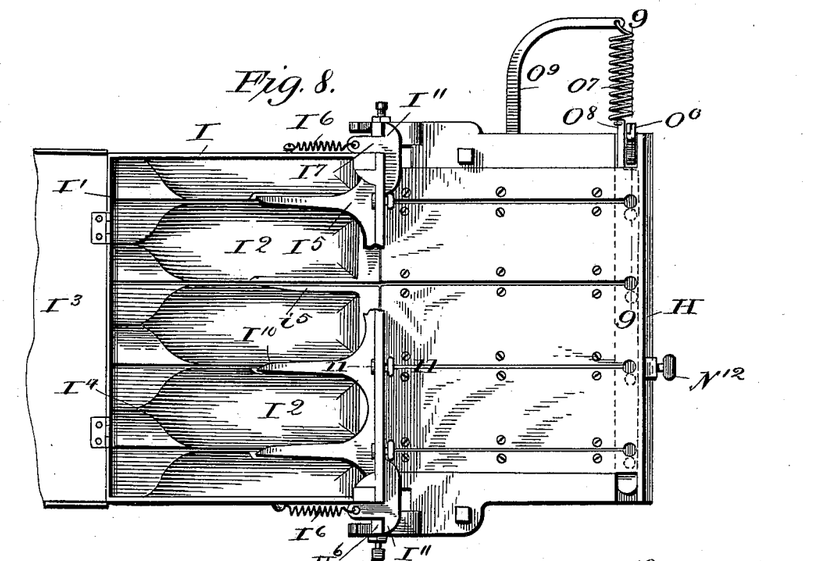
Fig. 8 is a plan of the nail-box and inclined feed-table.
Figures 9, 10, 11, 12:
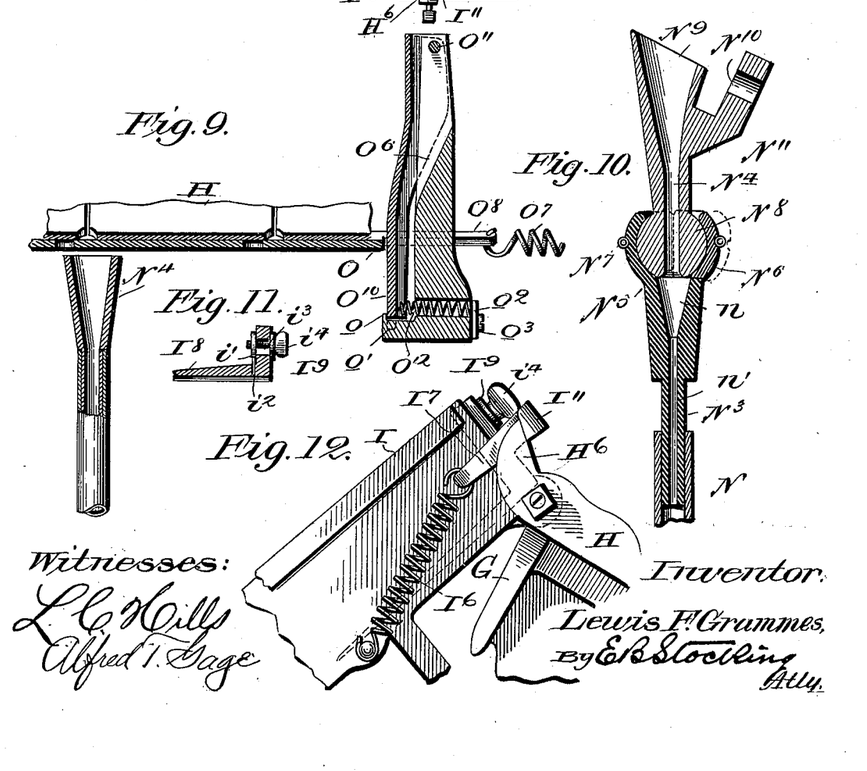
Fig. 9 is a vertical section on the line 9 9 of Fig. 8.
Fig. 10 is a vertical central section of a nail-funnel and telescopic feed-tubes connected therewith.
Fig. 11 is a vertical section on the line 11 11 of Fig. 8 through the nail-rake.
Fig. 12 is a side elevation of a nail-box and the upper end of the inclined feed-table.

The picker-bar is actuated in one direction by a safety-cam O⁶, Fig. 9, and in the opposite direction by a spring O⁷, engaging a projection O⁸ from the bar O, the opposite end of said spring being connected to a rigid bracket O⁹. (See Figs. 8 and 9.) This spring exerts a tension to normally bring the nail-delivery apertures into alinement, and the safety-cam O⁶ operates in opposition to this spring. The cam-face O¹⁰ of cam O⁶ is pivoted at its upper end, as at O¹¹, and forced outwardly at its lower end by a spring O¹², which movement is limited by a suitable stop $o$, and lateral movement of the cam prevented by lugs $o'$, extending downward therefrom at opposite sides of the base of the cam O⁶. The spring O¹² is introduced through an aperture $o^2$, which is suitably closed by a cover-plate $o^3$, and said spring is of sufficient tension to permit the regular and usual operation of the picker-bar without any compression or action of the same. When for any reason a defective nail is caught in the picker, so as to clog or prevent movement of the bar O, this cam-face O¹⁰ yields against the tension of the spring O¹² to prevent injury to any part of the bar or of the machine, and upon the next stroke the nail or other obstruction removes itself from the slide. This cut-off or picker-bar is constructed to pick off one nail from each of the several tracks or ways H² and is positive in its action, being a single piece of metal, and by the construction of cam all danger of injury from irregular nails is obviated.

The movable feed-box I, Fig. 8, is provided with a series of tracks or ways I' and with depressed portions I², inclining downward at the opposite sides of the tracks or ways I'. The box is also provided with a cover I³, adapted to permit access to the nails therein. The tracks or ways I' are in alinement with the ways formed in the inclined feed-plate, whereby the nails, when the box is in an elevated position, are fed on to the feed-table, while when the rear end of the box is depressed by means of the connection A⁸, Fig. 1, of the actuating mechanism the feed of the nails will be cut off. The depressed portions of the box I cause the nails to fall away from the tracks or ways I', and at the rear of the box an inclined portion I⁴ is provided adapted to feed the nails into the ways. To prevent a clogging of the track or way by the entrance of surplus nails thereinto or the catching of a nail at a lateral angle thereto, a movable rake or track-cover I⁵ has been provided and constitutes the front wall of the feed-box I. This rake is properly held against oscillation, but is mounted to reciprocate over the nail-tracks in the box. The rake is normally held in position under the tension of springs I$^6$, connected to a finger I$^7$, extending therefrom at opposite sides of the box. The rake is also provided with fingers I$^8$, provided with grooves $i$ to permit the passage of the nail-heads beneath the fingers, and with a cut-off I$^9$, as shown in detail in Fig. 11, which consists of a plate $i'$, provided with a pin or point $i^2$, adapted to pass through a suitable aperture in finger I$^8$, said pin and plate being adjustably mounted in a slot $i^3$, formed in the rake I$^5$, and adapted to be clamped in position by means of the thumb-screw $i^4$. By loosening this screw and slipping downward the pin $i^2$ the feed of nails through the way beneath the cut-off is prevented, so that any one or more of the ways may be used independently of the others. The inner ends of the fingers I$^8$ are beveled at an angle to their length, as shown at I$^{10}$, thus producing a shearing movement of the finger as the rake reciprocates, such movement being across and upon the flattened faces $i^5$ at opposite sides of the tracks or grooves I'. This movement removes any nails which may lie upon the track or any irregularly-placed nails, so as to insure the nails leaving the feed-box in proper condition and position to pass on to the inclined feed-table H. The reciprocation of this rake is produced by means of oppositely-disposed lugs I$^{11}$, which in the swinging movement of the nail-box engage stops H$^6$, Figs. 8 and 12, at opposite sides of the box, and thus limit the oscillatory movement of the rake with the box, while permitting the continued movement of the box I. The result of this is to cause a reciprocation of the rake and the box-front in relation to the box and bring the inclined faces I$^{10}$ of the rake across the tracks or ways I' for the purposes hereinbefore set forth.

Figures 18, 19:
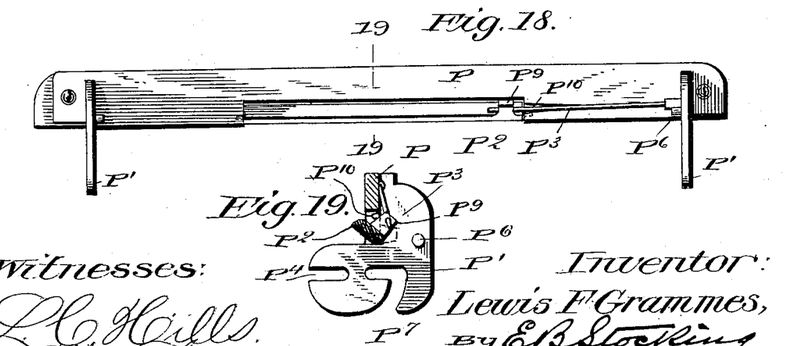
Fig. 18 is a rear view of the back gage on the main table of the machine.
Fig. 19 is an elevation in section on the line 19 19 of Fig. 18.

In the foregoing description the principal or essential elements of construction for a nailing-machine have been described. To facilitate work with the machine, it has, however, been found desirable to provide a framer-gage adapted for connection with this or any similar construction of nailing-machine for use in nailing the opposite sides to the end portions of a box. In Figs. 18 and 19 a main-gage-bar P has been illustrated, which is removably located at the rear of the table C. The opposite ends of this gage-bar are provided with hooked portions P', adapted to be removably connected to the sides of the table. The bar P is centrally provided with a pivoted step P$^2$, adapted to rest upon the table and also to be pushed into a recess in the bar out of operative position, but is normally tilted or projected beyond the face of the bar next the front of the machine by means of a spring P$^3$ or other suitable device. This step P$^2$ is equivalent in thickness to one of the boards constituting a side of the box, so that in nailing the first end to a side section the end section is rested upon the step P$^2$, which is thereby depressed and elevates the end to a height equivalent to the remaining side which has not as yet been attached. The first side is then nailed and the box reversed and placed against the face of the step P$^2$, so as to push the same back into the recess in the face of the bar P, as shown by dotted lines in Fig. 19, when the opposite side may be attached. This enables the construction of a box without at any time changing the position of the table, as the box is always supported in proper relation to the nailing mechanism. The framer-gage P is removably supported upon the table by means of a slot P$^4$, adapted to rest upon a pin P$^5$ as a pivot, after which the guide is swung downward until the stop P$^6$ rests upon the table, this swinging movement being guided by means of a curved slot P$^7$, in connection with which a suitable clamping device or nut P$^8$ is adapted to coöperate to hold the gage in its adjusted position. This will permit the ready removal of the gage whenever found necessary. The step P$^2$ is held in its medium position, as shown in Fig. 19, by an attaching-spring P$^3$, rigidly connected to the bar at one end and passing the opposite end through a suitable socket P$^9$, projecting from the rear of the step at its lower portion—that is, in a horizontal plane below that in which the opposite end of the spring is attached. The free end of the spring is movable within said socket, and in the continued movement of the step the spring is seated within a suitable recess P$^{10}$, formed within the bar. The step P$^2$ is thrown down into acting position by sliding the work downward in contact with the gage-plate P and with equal facility thrown up and back out of the way by sliding the work horizontally in contact with the table until stopped by the gage-plate P.

A removable bed-plate Q is also provided, as shown in Fig. 1 and by dotted lines in Fig. 4, which in some classes of work is desirable in order to lift the work the thickness of one side or portion while the opposite portion is being nailed. This plate is provided with pins O', adapted to fit and seat in the apertures C$^{20}$, formed in the table C.

Figures 5, 6, 7:
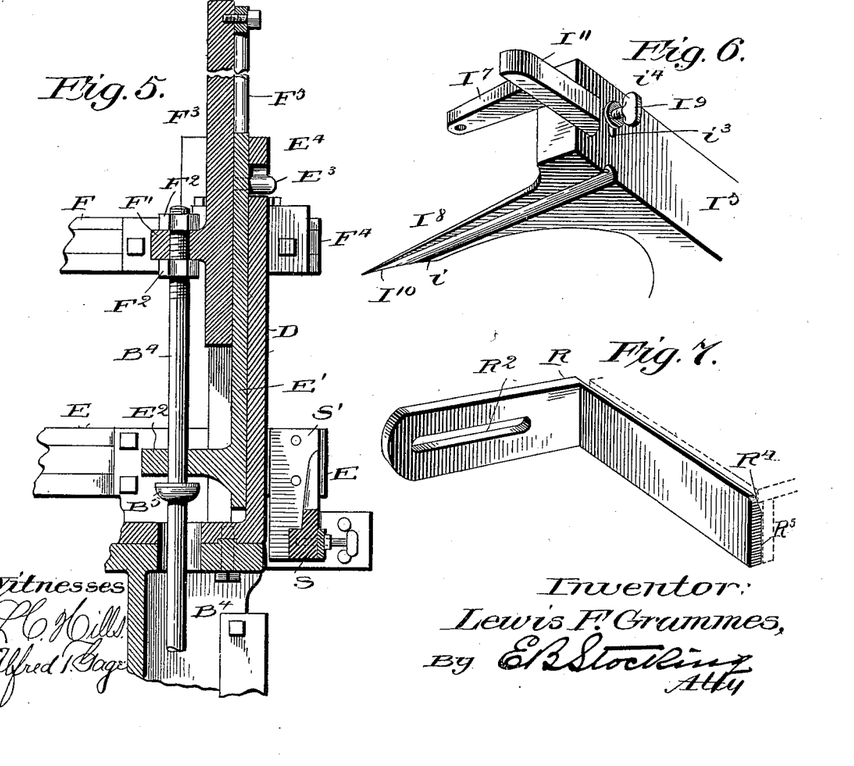
Fig. 5 is a vertical transverse section of the guides at one side of the framework and at the upper portion thereof, taken on the line 5 5 of Fig. 1.
Fig. 6 is a detail in perspective of the nail-box rake.
Fig. 7 is a similar view of an end gage.

The chuck-bar or other suitable part of the mechanism may also be provided with an adjustable end stop R, secured by means of a thumb-nut R', passing through a slot R$^2$, so as to be longitudinally adjustable upon the table. The gage or member R$^3$ of this stop is beveled at its upper portion, as shown at R$^4$ in Fig. 7, in order to permit the necessary or desired overlapping of one board of a box upon another in the construction of certain classes of boxes. It will be obvious that the beveled portion R$^4$ when going down with the chuck-bar permits the end of a board to be pressed or forced by hand beyond the outer vertical face of a board resting in contact with the stop R³, so that the first-mentioned board is to be nailed to the last-mentioned board with its end projecting beyond the same.

The beveled end stop R heretofore described may be carried by the framer-gage P, but can, if desired, be carried by a removable gage S, supported by opposite depending hangers S', extending downward from the chuck-bar E. This gage S is held against longitudinal movement by means of thumb-screws S² or other desired devices passing through extensions upon opposite ends of the gage and bearing against or threaded into the hangers S'. The gage is further held against lateral movement by means of screws S³, passing through the angle extensions S⁴ of the gage S and bearing against or threaded into the rear wall of the hangers S'. By the means just described the gage S and end stop R may be adjusted vertically upon the hangers S' and firmly secured in position, so that they will descend with the chucks when the same engage the work. A suitable end stop T is also provided and has a slotted extension T', which may be adjustably clamped to any desired part—for instance, the framer-gage P—by means of a thumb-screw T². This gage will engage the lower portion of the box or work and support the same in proper relation to the chucks and removable stop R.

The detail operation of the several parts will be apparent from the foregoing description, and it will be seen that after the table is adjusted to the proper elevation the actuation of the driving mechanism will cause the chuck carried by the chuck-bar to engage the work to be nailed. The hammer-bar then continues its descent, passing the hammers through the chucks and driving the nails, said nails having in the meanwhile been fed to the chucks through the mechanism of the picker or cut-off. Simultaneously with the downward movement of the hammer and chuck-bars the feed-box is depressed, the rake or track-cover operated, and the nails carried to the rear end of the box. In the return movement of the box the nails will be received in the slots, and when the box has assumed a position in alinement with the inclined feed-table the nails will be fed upon said table to the picker or cut-off. This machine embodies in the simplest possible construction a positive and efficient operation of all of the parts, thus obviating the necessity for complicated and expensive structures both in the feeding, picker, and nailing mechanisms, such as has heretofore been found necessary.

It is obvious that numerous changes may be made in the details of construction and configuration of the several parts without departing from the spirit of the invention as defined by the appended claims.

Having described my invention, what I claim as new, and desire to secure by Letters Patent, is—

1. In a nailing-machine, an oscillating feed-box having nail-tracks therein and a sliding rake adapted to move longitudinally along said tracks and provided with teeth having each a single inclined face extending across the nail-tracks of said box; substantially as specified.

2. In a nailing-machine, an oscillating feed-box having nail-tracks therein, a sliding rake adapted to move longitudinally along said tracks and provided with teeth having each a single inclined face extending across the nail-tracks of said box, and means for holding said rake during the movement of the box; substantially as specified.

3. In a nailing-machine, an oscillating feed-box having nail-tracks therein, a sliding rake adapted to move longitudinally along said tracks and provided with teeth having each a single inclined face extending across the nail-tracks of said box, means for holding said rake during the movement of the box; and a tension device normally holding said rakes at their inward limit of movement in said box; substantially as specified.

4. In a nailing-machine, a nail-box provided with tracks or ways, a front piece slidingly mounted in said box, rake-teeth projecting inward from said front and provided with inclined faces lying over said tracks or ways, projections from said front, and stops carried upon a fixed part of the machine to engage said projections; substantially as specified.

5. In a nailing-machine a nail-box provided with tracks or ways, a front piece slidingly mounted in said box, rake-teeth projecting inward from said front and provided with inclined faces lying over said tracks or ways, projections from said front, stops carried upon a fixed part of the machine to engage said projections, and a spring extending from said front plate to said feed-box; substantially as specified.

6. In a nailing-machine, a nail-box provided with tracks or ways, a front piece slidingly mounted in said box, rake-teeth projecting inward from said front and provided with inclined faces lying over said tracks or ways, projections from said front, stops carried upon a fixed part of the machine to engage said projections, a spring extending from said front plate to said feed-box, and a feed-stop pin carried by said front plate and adapted to enter said tracks or ways; substantially as specified.

7. In a nailing-machine, the combination with an oscillating nail-box having nail-tracks therein, of a front plate provided with a slot, a plate carrying a feed-stop pin, means for clamping said plate in its adjusted position, and an inwardly-extending rake-finger movable along said tracks and having a single inclined face and provided with a groove in its under face corresponding with the track or way; substantially as specified.

8. In a nailing-machine, the combination with a feed track or way, of a sliding cut-off or picker-bar provided with feeding-slots, a reciprocating safety-cam provided with a continuous contact-face pivoted at one end and at its opposite end provided with a spring-cushion adapted to hold said end away from the support upon which said cam is pivoted, means for reciprocating said cam, and means for holding said bar in contact with the cam between its ends; substantially as specified.

9. In a nailing-machine, the combination with a feed track or way, of a sliding cut-off or picker-bar provided with feeding-slots, a reciprocating safety-cam provided with a continuous contact-face pivoted at one end and at its opposite end provided with a spring-cushion adapted to hold said end away from the support upon which said cam is pivoted, means for reciprocating said cam, means for holding said bar in contact with the cam between its ends, a stop to limit the movement of said face from said cam, and lugs carried by said face to prevent lateral movement thereof.

10. In a nailing-machine, the combination with a track or way, of a sliding picker-bar provided with a discharge-recess, a guideway having parallel walls and a nail-picking point, the under surface of which is beveled or cut away to prevent contact with the body of said nail; substantially as specified.

11. In a nailing-machine, a nail-feeder having a ball termination, a socket for said ball having a removable wall, a removable elastic band surrounding the periphery of said walls, and means for retaining said band in position; substantially as specified.

12. A nail-chuck for nailing-machines comprising opposite tension-jaws normally held together by springs of different tensions, a casing within which said jaws are mounted, and an adjustable stop to limit the inward movement of the jaw under the greater tension; substantially as specified.

13. A nail-chuck for nailing-machines comprising opposite tension-jaws normally held together, a casing within which said jaws are mounted, an adjustable stop to limit the inward movement of one of said jaws, and a squared shank upon said stop adapted to fit within an angular aperture formed in said casing; substantially as specified.

14. A nail-chuck for nailing-machines comprising opposite tension-jaws normally held together, a casing within which said jaws are mounted, an adjustable stop to limit the inward movement of one of said jaws, a squared shank upon said stop adapted to fit within an angular aperture formed in said casing, and an auxiliary jaw provided with an operating-handle and adapted to move one of said tension-jaws from the other; substantially as specified.

15. A chuck for nailing-machines comprising oppositely-located jaws held together under tension, an auxiliary jaw provided with an operating-lever and adapted to move one tension-jaw away from the other, and means for normally holding said auxiliary jaw out of contact with the tension-jaw; substantially as specified.

16. In a nailing-machine, the combination with a hammer and means for actuating the same, of a chuck-casing provided with a groove for said hammer and with a nail-receiving groove merging into said hammer-groove, spring-held jaws upon opposite sides of said hammer, and an auxiliary jaw provided with an operating-lever and normally held in contact with said hammer; substantially as specified.

17. In a nailing-machine, the combination with a hammer and means for actuating the same, of a chuck-casing provided with a groove for said hammer and with a nail-receiving groove merging into said hammer-groove, jaws upon opposite sides of said hammer, springs of different tensions acting on said jaws, an auxiliary jaw provided with an operating-lever and normally held in contact with said hammer, and an adjustable stop to limit the inward movement of the jaw under the greater tension; substantially as specified.

18. In a nailing-machine, the combination with a hammer and means for actuating the same, of a chuck-casing provided with a groove for said hammer and with a nail-receiving groove merging into said hammer-groove, jaws upon opposite sides of said hammer, springs of different tensions acting on said jaws, an auxiliary jaw provided with an operating-lever and normally held in contact with said hammer, an adjustable stop to limit the inward movement of the jaw under the greater tension, and a stop to limit the outward movement of the opposite spring-jaw when the same is opened by means of the auxiliary jaw; substantially as specified.

19. In a nailing-machine, a chuck-supporting bar provided with an undercut longitudinal slot, a chuck, a bail or chuck clamp surrounding the same and provided with a head traveling in said slot, and a clamping device to secure said chuck within said bail; substantially as specified.

20. In a nailing-machine, the combination with a chuck-supporting bar, of a bail-holder adjustably mounted on said bar and provided with an angle-arm, a bail seated in a recess in said arm, and a clamping-screw for holding said bail in position; substantially as specified.

21. In a nailing-machine, the combination with a power mechanism, of a hammer or driver bar reciprocated thereby, a chuck-supporting bar raised in the movement of the hammer-bar and lowered by gravity, a positively-actuated reciprocating picker-cam having a continuous contact-face pivoted at one end and a cushion-spring at the opposite end thereof, a picker-bar actuated by said face and held in contact therewith, hammers and chucks carried by their respective bars, and a work-supporting table; substantially as specified.

22. In a nailing-machine, the combination with a driving mechanism, of an oscillating feed-box having nail-tracks and pivotally mounted at its front edge, a crank-arm, connections extending from said arm to the rear of said feed-box and to said driving mechanism, a sliding rake above said tracks, means for holding the rake during the box motion and means for conducting and driving the nails fed by said box; substantially as specified.

23. In a nailing-machine, the combination with driving mechanism, of reciprocating hammer and chuck bars each having an angle extension, the chuck extension being slotted, chucks mounted in an angle-arm of a holder adjustable longitudinally in the slot of said extension, a feeding device, and adjustable connecting-tubes extending from said feeding device to said chucks; substantially as specified.

In testimony whereof I affix my signature in presence of two witnesses.

LEWIS F. GRAMMES.

Witnesses:
HARRY F. SMITH,
JOHN A. XANDER.